United States Patent
Kostner et al.

(10) Patent No.: US 9,512,539 B2
(45) Date of Patent: Dec. 6, 2016

(54) PROCESS FOR REMOVING A COATING FROM WORKPIECES

(75) Inventors: Mirco Elias Kostner, Innsbruck (AT); Udo Rauch, Schlins (AT)

(73) Assignee: OERLIKON SURFACE SOLUTIONS AG, PFAFFIKON, Pfaffikon (CH)

( * ) Notice: Subject to any disclaimer, the term of this patent is extended or adjusted under 35 U.S.C. 154(b) by 0 days.

(21) Appl. No.: 13/823,767

(22) PCT Filed: Sep. 22, 2011

(86) PCT No.: PCT/EP2011/004739
§ 371 (c)(1),
(2), (4) Date: Jun. 6, 2013

(87) PCT Pub. No.: WO2012/038083
PCT Pub. Date: Mar. 29, 2012

(65) Prior Publication Data
US 2013/0240373 A1  Sep. 19, 2013

(30) Foreign Application Priority Data
Sep. 24, 2010 (DE) .................. 10 2010 046 372

(51) Int. Cl.
B23H 3/00 (2006.01)
C25F 3/02 (2006.01)
C25F 1/00 (2006.01)
C25F 5/00 (2006.01)

(52) U.S. Cl.
CPC . *C25F 3/02* (2013.01); *C25F 1/00* (2013.01); *C25F 5/00* (2013.01); *B23H 2300/00* (2013.01)

(58) Field of Classification Search
CPC .................. C25F 3/02–3/14; C25F 3/16–3/30; C25F 7/00; C25F 5/00
USPC .................................................. 205/640–686
See application file for complete search history.

(56) References Cited

U.S. PATENT DOCUMENTS

| | | |
|---|---|---|
| 3,900,376 A | 8/1975 | Copsey et al. |
| 6,627,064 B1 * | 9/2003 | Hans ........................... 205/646 |
| 2008/0053841 A1 * | 3/2008 | Baertsch et al. .............. 205/640 |

FOREIGN PATENT DOCUMENTS

EP    1362934 A1    11/2003

OTHER PUBLICATIONS

Conde, A.; Cristobal, A.B.; Fuentes, G.; Tate, T.; de Bamborenea, J. "Surface analysis of electrochemically stripped CrN coatings" Surface and Coating Technology, 201 (2006), p. 3588-3595.*

(Continued)

*Primary Examiner* — Nicholas A Smith
*Assistant Examiner* — Brian W Cohen
(74) *Attorney, Agent, or Firm* — Pearne & Gordon LLP

(57) ABSTRACT

The invention relates to a process for electrochemically removing a coating from coated workpieces by means of a voltage applied in an electrolyte bath between the workpiece and a counter-electrode. According to the invention, a rising voltage profile is selected during the coating removal process. This has the effect that the voltage applied at the start is low, and therefore the workpieces are not damaged, but nevertheless the rise in the voltage prevents the coating removal process taking an uneconomically long time.

6 Claims, 2 Drawing Sheets

(56) References Cited

OTHER PUBLICATIONS

Cristobal et al., "Electrochemical stripping of hard ceramic chromium nitride coating", Thin solid Films, Elsevier-Sequoia S.A., Lausanne, CH, vol. 484, No. 1-2, Jul. 22, 2005, pp. 238-244.
Sen, et al., "Stripping of CrN from CrN-coated high speed steels", Surface & Coatings Technology, Elsevier, Amsterdam, NL, vol. 113, No. 1-2, Jan. 1, 1999, pp. 31-35.

* cited by examiner

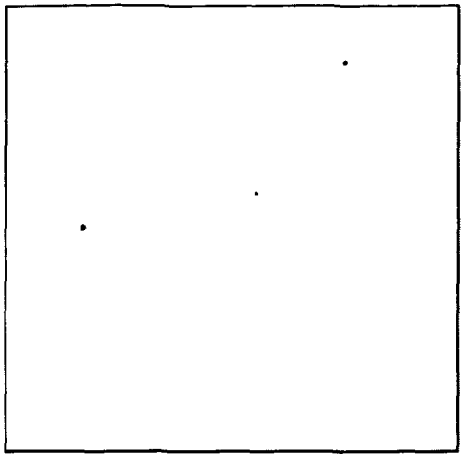
Figure 2
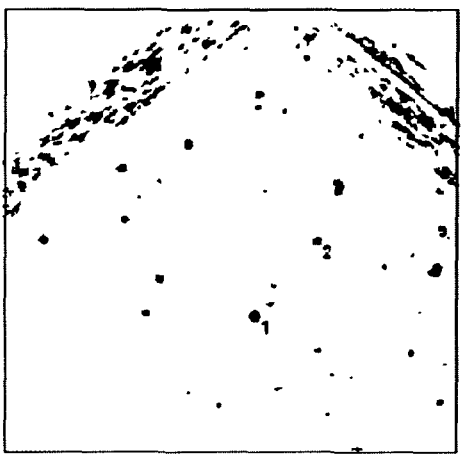
Figure 3
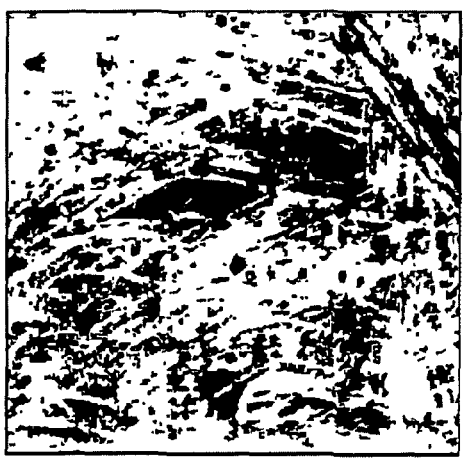
Figure 4
Figure 6
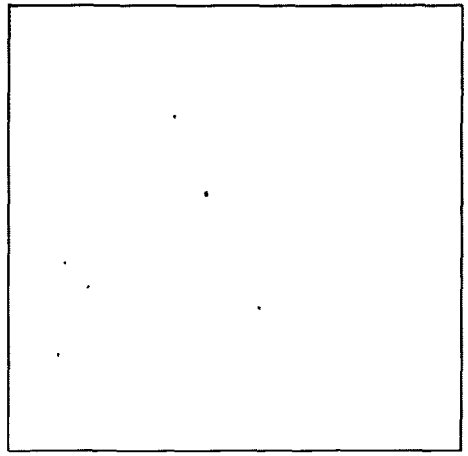

PROCESS FOR REMOVING A COATING FROM WORKPIECES

The present invention relates to a process for removing a coating from workpieces with a non-conducting coating, in particular two-layer or multilayer systems and/or corresponding workpiece holders. Processes for removing coatings are used in order for example to free workpiece holders used—and inevitably also coated—in coating facilities from their coating and make them suitable for use again. Furthermore, processes for removing coatings are used for stripping coatings from worn or improperly coated workpieces and thus preparing them for recoating.

To remove the coating from worn and improperly coated workpieces, electrochemical processes are also used, such as described for example in WO2008/028,311. For this purpose, coat-stripping facilities are used for example that include a tank for containing a liquid electrolyte, wherein inside the tank a counter-electrode can be connected to one pole of a power supply device is provided. Most coat-stripping facilities include means for holding the workpieces whose coating is to be removed. In general, the workpieces have to be individually contacted in such a way that they are connected as anodes and the counter-electrode as cathode to a power supply.

During use, the tank is filled with the electrolyte and the workpiece is immersed in the electrolyte. Between the workpiece and the counter-electrode, a predetermined constant voltage is applied that causes the workpiece's coating to be removed. The counter-electrode surface must be formed and positioned in such a way that the current flow is distributed as evenly as possible over the workpiece's surface areas whose coating is to be removed, in order to achieve a uniform removal of the coating and to avoid corrosion of the base body bearing the coating.

Different factors influence the coating removal process. These include among others the temperature, the electrolyte used, the voltage, the current as well as the geometry, position and distance of the workpiece in relation to the counter-electrode. In this respect, it must be noted that these factors also mutually influence each other. For example, a rise in temperature in the bath will generally result in an increased conductivity. If the bath is controlled by voltage, the current flow will be increased in this case. If the bath is controlled by current, this will lead to a lower voltage. It is also clear that different electrolytes will result in a different temperature-conductivity behavior.

A further factor that influences the coating removal process is the conductivity of the layer or layers to be removed. One problem that can occur when removing in particular non-conducting layers is the damage to the surface of the base body such that the latter, after the coating removal according to the state of the art, is scarred with statistically distributed indentations. These indentations are hereinafter referred to as holes.

It can be observed that at a higher applied voltage, the size of the holes, i.e. the damage to the surface, increases. Conversely, a smaller voltage results in smaller holes and thus in reduced damage to the substrate surface. This would suggest choosing the voltage as low as possible in order to achieve as little damage as possible of the substrate surface. However, this leads to long coating removal times, which make the process of removing the coating expensive and in some circumstances even uneconomical. If for example a voltage of 16V results in a coating removal time of approx. 10 minutes but large holes, it can be that with a voltage of 5V, although the surface will be much less damaged, the coating removal process will last for over 3 hours. This means according to the state of the art that a compromise must be found between acceptable surface damage and acceptable coating removal time.

The chemical conversion that occurs during the coat stripping at a phase boundary metal/electrolyte solution can be illustrated by means of component currents $I_1$ and $I_2$. $I_1$ represents in this case the anodic component current connected with the metal loss, $I_2$ represents the component current connected with the cathodic oxygen reduction. If no voltage is applied, the resulting total current $I_G=0$, i.e. $I_1=I_2$. Under the influence of external currents, the total current $I_G$ and accordingly the potential $U(I_G)$ will change. This process is called polarization, the differential quotient $\Delta U/\Delta I=R_P$ polarization resistance and its reciprocal polarization conductance value. According to DE102004002763, the measured polarization current resp. the measured polarization value changes as a function of the applied direct-current voltage. In this manner, it is consequently possible to determine a polarization current to control voltage characteristic/curve resp. a polarization conductance value to control voltage characteristic/curve. In DE102004002763, the operating point is established where the polarization current, as a function of the direct-current voltage, takes on a maximum value, i.e. the polarization conductance value takes on the value zero. Unfortunately, this approach is only productive for electrically conducting coating materials. If the outer layer of the coating is an electrically non-conducting layer that is not merely a passivated one resulting from ambient oxidation but a deliberately applied one, this method will also result in the unacceptable holes described above.

In DE19840471 and also in WO9954528, electrolytic processes for removing coatings are also described that however also only relate to workpieces coated with an electrically conducting coat.

There is therefore a need for a coating removing process for coatings with surfaces that are not electrically conducting, which yields a less damaged surface within a shorter coating removal time.

It is the aim of the present invention to propose a process on the basis of an electrochemical process for removing a coating that leads to short process durations, yet with which damage to the surface of the workpiece to be stripped is prevented.

According to the invention, this aim is achieved in that the voltage applied to the workpiece is increased in the course of the coating removal process. According to the invention, both an incremental as well as a continual increase can be chosen during the process of removing a coating. The voltage progression chosen according to the invention is not necessarily monotonous. It is however important that at the beginning of the coating removal process, there is a phase with comparatively low voltage, which is then increased during the course of the coat stripping at least on average. With such a voltage progression, it has surprisingly been shown that the surface damage turns out to be considerably less than with a process that achieves comparable coating removal times at a constant voltage.

The inventors are uncertain as to why damage to the surface of the substrate is prevented with an increasing voltage progression. It can however be speculated that in particular when stripping non-conducting layers, first isolated small areas of the conducting substrate are exposed. In these local areas, there is then a sudden increase of the current density. The entire current flow concentrates on these small areas. This probably causes a locally concentrated temperature rise, which on the one hand causes an increase of the oxidation power there. In this respect, it cannot be excluded that particles are blasted out from the layer and carry away with them parts of the substrate. This can be prevented by applying such a low voltage at the beginning that this kind of damage is avoided.

When during the course of the coating removal, increasingly larger areas of the conducting substrate are exposed, the local current density decreases drastically while the total current flow remains constant. The voltage can then be increased, which then achieves a higher rate of coating removal.

In addition thereto, the inventors have observed that when using an inventive voltage progression, it is possible to considerably improve the process stability and which by the variations of the factors described above negatively affect the coating removal process in a considerably reduced manner. This applies in particular also for variously well-contacted workpieces.

THE FIGURES

FIG. 2 shows the surface of an untouched, i.e. not yet coated, workpiece.

FIG. 3 shows the surface of a workpiece whose coating has been removed with a constant voltage of 8 V.

FIG. 4 shows the surface of a workpiece whose coating has been removed with a constant voltage of 16 V.

FIG. 6 shows the surface of a workpiece whose coating has been removed with a step-process progression according to FIG. 5.

The invention will now be explained in detail on the basis of examples and with the aid of the figures.

In the example, the coating of so-called steel tappets are to be removed which are coated with a 2μm thick CrN layer and a 2μm thick DLC layer. This means that we have in this example a so-called two-layer system.

Figure 1:
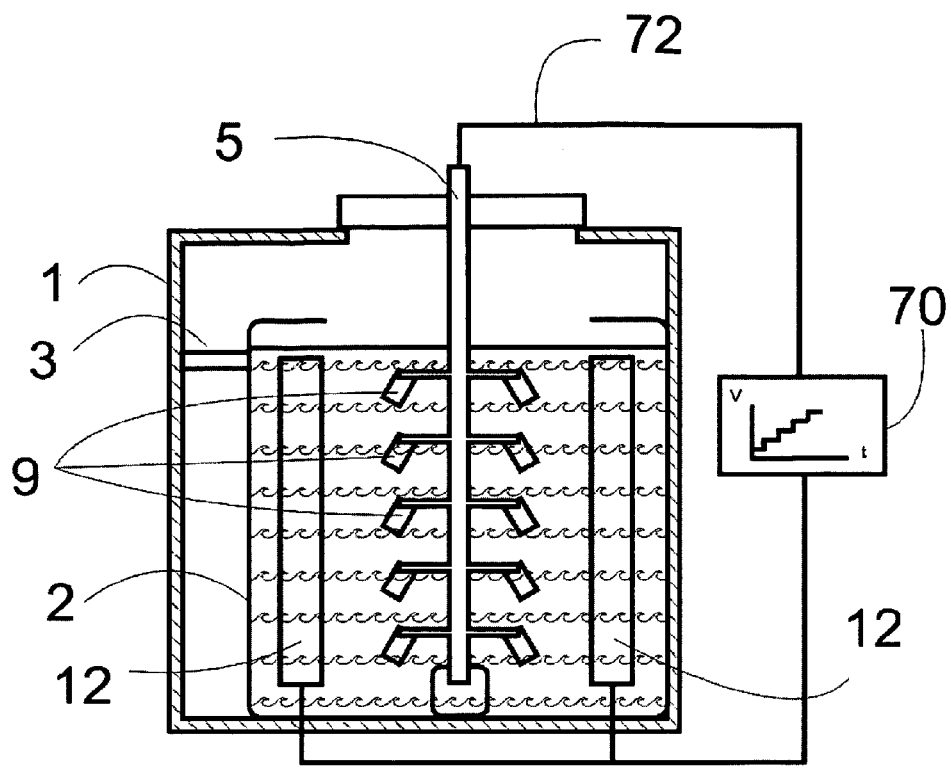
FIG. 1 shows a typical device for the electrolytic removing of a coating from workpieces.

FIG. 1 shows a coating removal unit having a rectangular-shaped housing 1 containing a tank 2 consisting of non-conducting material or coated on its inside with a non-conducting material, so that the inside wall is non conducting. It serves for containing an electrolyte. In addition to the tank 2, an overflow 3 with a strainer or a filter is provided.

The electrolyte in the example is an approx. 5 [Vol %] DECONEX HT1 175 in osmosis water.

The one pole 72 of a bipolar adjustable voltage source 70 is connected to a holder 5. During operation, the holder 5 is loaded with workpieces 9 whose coating is to be removed. For reasons of clarity, the reference only points to 3 of the workpieces. The voltage source 70 is executed as an adjustable voltage source that allows a continuous and/or incremental regulation. The holder 5 is connected with the housing 1 in such a way that it can be removed without great effort.

The other pole of the voltage source 70 is connected with a counter-electrode 12 that can be constructed for example as grid electrode, which is arrayed on the inside of the tank 2. The counter-electrode 12 has a counter-electrode surface facing towards the reception and which extends essentially over the entire height of the tank 2.

A heating and cooling device is furthermore provided in the tank 2, and also an ultrasound generator as well as an net for the electrolyte and devices for moving the latter such as pumps or stirrers (all not represented).

During operation, the tank 2 is filled at least as close as possible to the upper rim with a liquid electrolyte. The holder 5 as well as all other components of the coating removal unit provided in the tank 2 must be made of a material that is not attacked by the electrolyte, usually of stainless steel or, if this is not possible e.g. for some magnetic materials, be encapsulated in a stainless foil.

Figure 5:
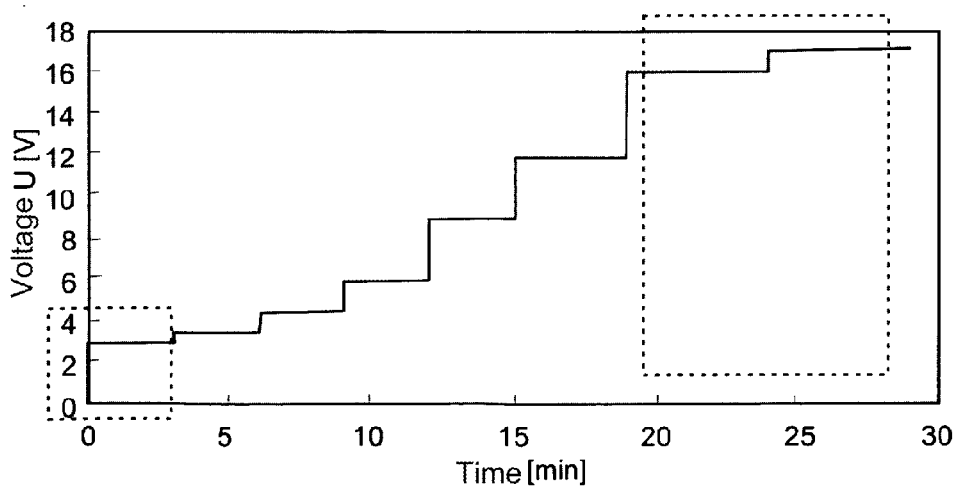
FIG. 5 shows an inventive step process progress of the voltage.

The voltage source 70 then generates a difference of potential between the workpiece and the counter-electrode, whose progression reflects that of FIG. 5.

In order to be able to appreciate the advantage of the present process, it is useful to compare the surface of workpieces whose coating has been removed with a conventional coating removal process and that of a new, uncoated workpiece with the surface of a workpiece whose coating has been removed according to the invention.

FIG. 2 accordingly shows a new, uncoated workpiece. It has only very isolated and small surface defects, as indicated for example with reference "1". This defect has a diameter of only 3 μm. By contrast, FIG. 3 shows the surface of a workpiece whose coating has been removed by means of a constant voltage of 8V. Such a voltage results in a coating removal time of approximately 2 hours. The workpiece corresponds to the workpiece of FIG. 2. Clear surface defects can be seen. The number of surface defects has increased and also their diameter, as the figure clearly shows. Furthermore, three defect spots "1", "2", "3" were measured, which yielded a diameter between 13 μm and 18 μm. FIG. 4 also shows a workpiece corresponding to FIG. 1 and whose coating has been removed at constant voltage. The voltage applied during the coating removal process was however now 16V. By this means, the coating removal time could be reduced down to 10 minutes. However, the number of defects and their size have dramatically increased as compared with FIG. 3. Three defects were measured by way of example, whose diameter was between 10 μm and 36 μm.

By contrast thereto, FIG. 6 shows a workpiece whose coating has been removed according to the inventive process. The workpiece corresponds again to that of the previous ones. According to FIG. 5, the voltage is kept at 3V for the first 3 minutes. This co-called safety step constitutes the first phase of the coating removal. Layer material is probably removed at the fine pores to the substrate. By keeping the voltage low, relatively little current will flow overall at first. From the third minute onwards, the voltage is increased slightly to 3.5V. Layer holes will have already formed on the substrate surface whose dimensions continuously increase. Erosion probably occurs mainly at the layer hole edge. With the increasing layer hole expansion, the overall available edge increases, so that the total current quantity can be increased without damaging the substrate. Accordingly, from the sixth minute, the voltage is increased to 4.5V. From the ninth minute, the voltage is set at 6V. From the twelfth minute, the voltage is raised to 9V. From the $15^{th}$ minute of the process, the voltage is increased to 12V. A further increase of the voltage to now 16V is carried out from the $19^{th}$ minute. If this is the first coating removal after a renewal of the electrolyte, the voltage is set at 17.5V after the twenty-fourth minute. Overall, the coat stripping thus lasts half-an-hour. This is considerably less time than for a coating removal by means of a constant 8V voltage. Despite the lower coating removal time, the surface, as is clearly shown in FIG. 6, is considerably less damaged as in the case with constant 8V. By comparison with the untreated workpiece surface according to FIG. 2, the number of defects only increased marginally. The size of the defects, being around 2 µm to 4 µm, was also in the range of the untreated surface. This method has thus made it possible to achieve a less damaged surface in spite of a lower coating removal time.

The voltage progression to be chosen is preferably adapted to different types of workpieces and different types of coatings, in order to optimize the process. It is however important to start with a low voltage in order to avoid defects. According to the invention, this voltage is increased in order to minimize the coating removal time.

There are different possibilities for the one skilled in the art to achieve an optimized voltage progression. For example, running several coat-stripping processes in a first series of tests with constant but each time differently high voltage and thus determining up to which voltage the surface remains acceptable, i.e. sufficiently intact. This voltage is then set as starting voltage V1.

In a second series of tests, the one skilled in the art will then set this determined starting voltage V1 over a coat-stripping start interval EI1, then after this coat-stripping start interval EI1 will increase the voltage and then again from that point continue coat stripping at a constant voltage that is yet different for each test. This will make it possible to verify how high the voltage can be chosen after the start interval without damaging the surface. The voltage V2 thus determined, which is greater in value than is then maintained constant over the second coat-stripping interval EI2.

A series of tests then follows for the third coat-stripping interval EI3, although the removal of the coating first occurs with V1 over EI1, then with V2 over EI2 and then the coat stripping is completed at different yet constant voltages. In this way, the maximum voltage V3 is reached at which the surface is essentially no longer attacked.

The choice of the intervals rests with the one skilled in the art. They can be chosen all of the same length or also of different lengths. The smaller the individual coat-stripping intervals, the more laborious it is to perform the series of tests but the closer to the optimum incremental process it is possible to get. In borderline cases it is even possible to achieve a continuously rising voltage progression. From a certain shortness of interval, the latter can also be interpolated without series of tests.

Advantageously, the inventive applied voltage progression is monotonous, in particular preferably even strictly monotonous. However, it should be clear from the above that momentary lowering the voltage will not damage the substrate surface, so that voltage progressions are to be considered inventive also if they do not increase monotonously but allow a smaller voltage over certain areas. This applies in particular also for applied alternating voltages that are for example limited in the starting phase to small amplitudes and that soar to higher amplitudes during the coating process. Series of tests similar to those described above will enable the one skilled in the art to approximate the optimum voltage progression.

The layers that are to be removed from the workpieces are preferably porous layers. In this manner, it is possible to ensure that when a low voltage is applied, a current flow and thus the electrolytic reaction will occur.

One characteristic of the process under discussion is that for a completely stripped part and with a high voltage (e.g. 16V) being still applied, no damage occurred to the substrate. A termination criterion for the coating removal process is not critical.

In the following example, the process was tested on the basis of different non-metallic layers, substrates and electrolytes and compared with the method of constant voltage according to the state of the art:

Example 1

Substrate: TiAl alloy, as is used for example for components in racing. Layer: CrC between 3-5 µm
Electrolyte: 5% Deconex HT1 175
Voltage progressions:
a) constant 10 V for 10 min
b) constant 8 V for 10-15 min
c) 3V 3 min, 5 V 5 min, 6 V 5 min
The parts were stripped with the methods a)-c), the duality of the coating removal increased from a)-c), which is shown by the reduction of the discoloration of the stripped substrate from a) to c). Consequently, the substrate stripped according to a) exhibits a strong discoloration, the substrate stripped according to b) a partial discoloration and the substrate stripped according to c) no discoloration.

Example 2

Substrate: steel 1 0.2379, as is used for example for mold making.
Layer: CrN between 3-5 µm
Electrolyte: 2% NaOH
Voltage progressions:
a) constant 12 V for 7-15 min
b) constant 7.5 V for 10-25 min
c) 2.5V 3 min, 5 V 5 min, 8 V 7 min, 10 V 7 min
The parts were stripped with the methods a)-c), the quality of the coating removal increased from a)-c).

Example 3

Substrate: HSS steel (hob), as is used for example for tools.
Layer: AlCrN between 3-5 µm
Electrolyte: 5% Deconex HT1175
Voltage progressions:
a) constant 12 V for 7-15 min
b) constant 8 V for 10-25 min
c) 2.5 V 3 min, 5 V 5 min, 8 V 7 min, 10 V 8 min
The parts were stripped with the methods a)-c), the quality of the coating removal increased from a)-c). A cylindrical cathode was used for the coating removal.

Example 4

Substrate: hard metal type k (borer), as is used for example for tools,
Layer: AlCrN between 3-5 µm
Electrolyte: NH4/NO3/CH3COOH (see EP1080254)
Voltage progressions:
a) constant 15 V for 3-60 s
b) 2.8 V 10 s, 5 V 10 s, 8 V 10 s, 10 V 10 s
The parts were stripped once with the method a) and once with the method b), the quality of the coating removal was better for b) than for a). A cylindrical cathode was used for the coating removal.

A process for removing a coating from workpieces having electrically non-conducting surfaces has been proposed, wherein the process is carried out by means of an electrolyte and includes the following steps:
preparing a tank, wherein inside the tank an electrode that can be connected to one pole of a power supply device is provided filling an electrolyte into the tank, so that the electrode comes into contact with the electrolyte immersing one or several workpieces into the electrolyte applying a voltage between the workpiece and the electrode for an at least partial removal of the workpiece's coating, wherein the voltage during the at least partial coating removal is adjusted in such a way that at a first point in time a first voltage is applied and at a later point in time a voltage is applied that is higher than the first voltage and which does not result in the formation of holes, wherein the application of the higher second voltage at the first point in time would have resulted in the formation of holes.

Preferably, the voltage during the at least partial removal of the coating is adjusted in such a manner that the value of the difference of potential between the electrode and the workpiece increases continuously and/or incrementally.

Preferably, the voltage is adjusted in such a manner that the difference of potential during the at least partial removal of the coating rises monotonously, preferably strictly monotonously.

The voltage can also be adjusted in such a way that at the beginning of the coating removal the difference of potential over a first time interval EI1 is maintained essentially constant at a first value U1 and the difference of potential during a time interval EI2 directly subsequent to the first time interval is maintained constant at a second value U2, wherein U1<U2.

The invention claimed is:

1. A process for removing a coating from workpieces having a conductive substrate and the coating comprising an electrically non-conducting surface, wherein the process is carried out by means of an electrolyte and includes the following steps:
   preparing a tank, wherein inside the tank an electrode that can be connected to one pole of a power supply device is provided
   filling an electrolyte into the tank, so that the electrode comes into contact with the electrolyte
   immersing one or several workpieces into the electrolyte, the one or several workpieces having the coating that comprises the electrically non-conductive surface, the coating comprising at least one of CrN, DLC, CrC and AlCrN
   applying a voltage between the workpiece and the electrode for at least partial removal of the coating characterized in that:
   the voltage during the at least partial coating removal is applied for a first time interval EI1 during which a first applied voltage U1 is maintained essentially constant and when increasingly larger areas of the conductive substrate are exposed during the course of the at least partial coating removal and when the local current density decreases,
   the voltage is increased to a second applied voltage U2 for achieving a higher rate of removal, wherein the increased voltage U2 is maintained essentially constant during a second time interval EI2, beginning at a later point in time than the first time interval EI1, and
   wherein the increased voltage U2 is higher than the first voltage U1 and does not result in the formation of holes in the substrate, and wherein the value of the second voltage U2 is chosen in such a manner that if the second voltage U2 would have been applied during the first time interval EI1, it would have resulted in the formation of holes in the substrate.

2. Process according to claim 1, characterized in that the voltage during the at least partial removal of the coating is adjusted in such a manner that the value of the difference of potential between the electrode and the workpiece increases incrementally.

3. Process according to claim 1, wherein the voltage ranges between 2.5 volts and 17.5 volts.

4. Process according to claim 1, characterized in that at least the non-conductive surface is porous.

5. Process according to claim 1, characterized in that at least the non-conductive surface comprises DLC.

6. A process for removing a coating from workpieces having a conductive substrate and the coating comprising an electrically non-conducting surface, wherein the process is carried out by means of an electrolyte and includes the following steps:
   preparing a tank, wherein inside the tank an electrode that can be connected to one pole of a power supply device is provided
   filling an electrolyte into the tank, so that the electrode comes into contact with the electrolyte
   immersing one or several workpieces into the electrolyte, the one or several workpieces having the coating that comprises the electrically non-conductive surface, the coating comprising at least one of CrN, DLC, CrC and AlCrN
   applying a voltage between the workpiece and the electrode for at least partial removal of the coating characterized in that:
   the voltage during the at least partial coating removal is applied for a first time interval EI1 during which a first applied voltage U1 is maintained essentially constant and when increasingly larger areas of the conductive substrate are exposed during the course of the at least partial coating removal and when the local current density decreases,
   the voltage is increased from the first applied voltage U1 to a second applied voltage U2 for achieving a higher rate of removal, wherein the increased voltage U2 is maintained essentially constant during a second time interval EI2, beginning at a later point in time than the first time interval EI1,
   the voltage is increased from the second applied voltage U2 to a third applied voltage U3, wherein the increased third applied voltage U3 is maintained essentially constant during a third time interval EI3, beginning at a later point in time than the second time interval EI2, and
   the voltage is increased from the third applied voltage U3 to a fourth applied voltage U4, wherein the increased fourth applied voltage U4 is maintained essentially constant during a fourth time interval EI4, beginning at a later point in time than the third time interval EI3,
   wherein the second applied voltage U2, the third applied voltage U3, and the fourth applied voltage U4 are higher than the first voltage U1, the second applied voltage U2 and the third applied voltage U3, respectively, and do not result in the formation of holes in the substrate, and wherein the value of the second voltage U2, the third applied voltage U3 and the fourth applied voltage U4 are chosen in such a manner that if the second voltage U2, third applied voltage U3 and fourth applied voltage U4 would have been applied during the first time interval EI1, it would have resulted in the formation of holes in the substrate.

* * * * *

UNITED STATES PATENT AND TRADEMARK OFFICE
CERTIFICATE OF CORRECTION

PATENT NO. : 9,512,539 B2  Page 1 of 1
APPLICATION NO. : 13/823767
DATED : December 6, 2016
INVENTOR(S) : Mirco Elias Kostner et al.

It is certified that error appears in the above-identified patent and that said Letters Patent is hereby corrected as shown below:

In the Specification

Column 5, Line 27, insert -- V1 -- after the word "than".

Column 6, Line 10, replace "10" with -- 7-10 --. (Second Occurrence)

Column 6, Line 13, replace "duality" with -- quality --.

Column 6, Line 23, replace "0.2389" with -- .2379 --.

Signed and Sealed this
Fourteenth Day of March, 2017

Michelle K. Lee
*Director of the United States Patent and Trademark Office*